United States Patent [19]
Burke

[11] Patent Number: 4,957,014
[45] Date of Patent: Sep. 18, 1990

[54] CABLE DRIVE GEOMETRY

[75] Inventor: Edward F. Burke, Lake Oswego, Oreg.

[73] Assignee: Tektronix, Inc., Beaverton, Oreg.

[21] Appl. No.: 335,359

[22] Filed: Apr. 10, 1989

[51] Int. Cl.$^5$ .............................................. F16H 19/06
[52] U.S. Cl. .................................. 74/89.22; 74/500.5; 74/506
[58] Field of Search ...................... 74/89.22, 500.5, 506

[56] References Cited

U.S. PATENT DOCUMENTS

| | | | |
|---|---|---|---|
| 3,403,578 | 10/1968 | Morse | 74/500.5 |
| 3,500,692 | 3/1970 | Sangster et al. | 74/89.22 |
| 3,743,381 | 7/1973 | Moodie | 74/89.22 X |

OTHER PUBLICATIONS

IBM Technical Disclosure Bulletin, vol. 22, No. 88, Jan. 1980, p. 3758, "Ratchet Control of Cable Drive for Printer Escapement", by C. G. Brown.

*Primary Examiner*—Allan D. Herrmann
*Attorney, Agent, or Firm*—John D. Winkelman; Edward B. Anderson

[57] ABSTRACT

An apparatus providing a substantially fixed length cable drive comprises a motor-driven capstan having a helical groove. The groove on the capstan is sized to receive opposite ends of a cable for simultaneously letting out and taking up the cable. The cable passes over a fixed pulley and is attached to a carriage at a point intermediate the capstan and pulley. The carriage is guided along a rail defining a fixed mass path. The section of cable between the carriage and pulley is parallel to the mass path. The cable ends on the capstan are disposed on opposite sides of a plane containing the parallel cable section during travel of the carriage along the mass path.

9 Claims, 2 Drawing Sheets

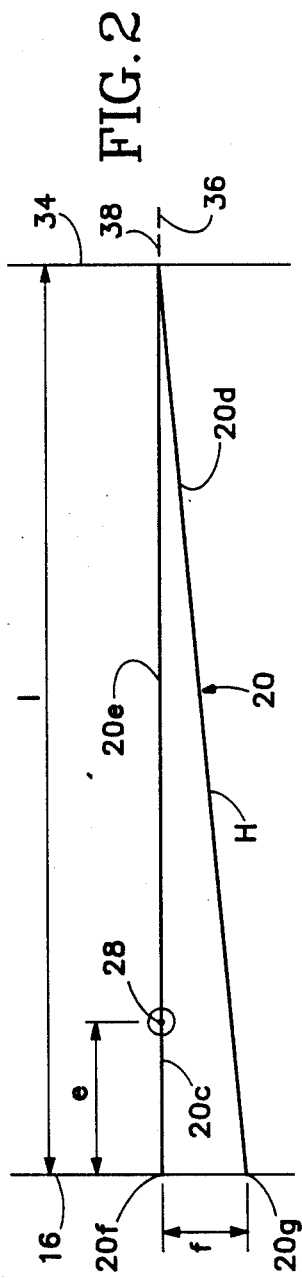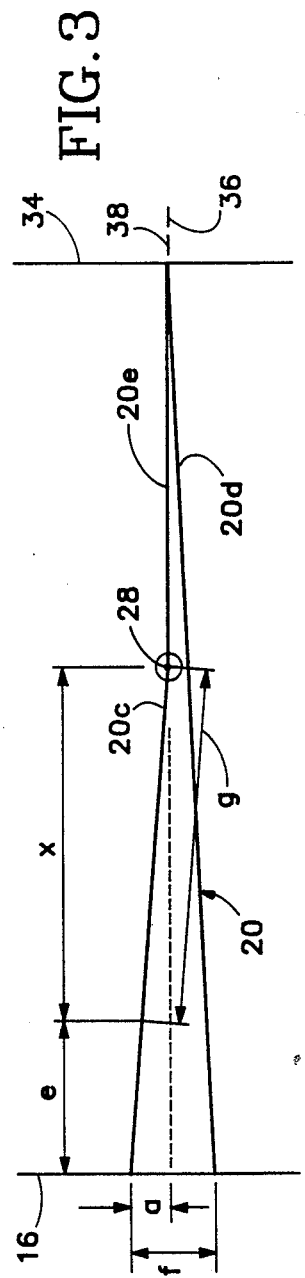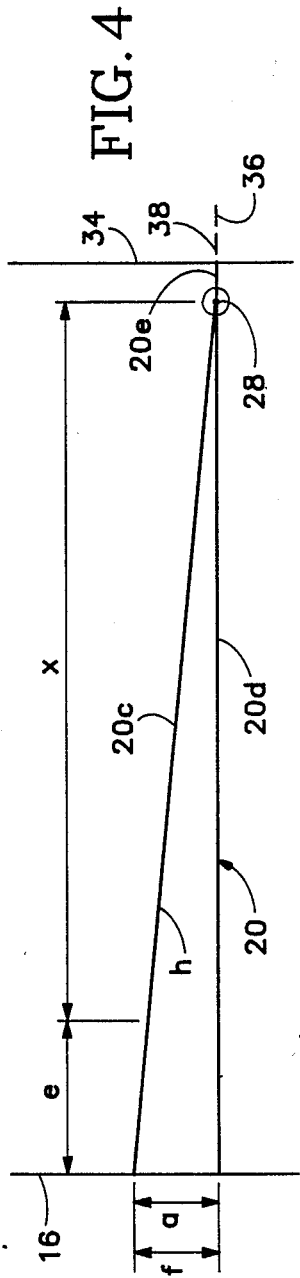

CABLE DRIVE GEOMETRY

FIELD OF THE INVENTION

This invention relates to cable drives for moving a mass along a predetermined path, and in particular, to such a drive having a geometry with reduced cable path length variance.

BACKGROUND OF THE INVENTION

The preferred embodiment of the present invention is particularly directed to a cable drive system for moving an ink jet printer along a guide bar for scanning a print medium on which an image is printed. In general terms the underlying invention is directed to a cable drive system for moving a mass along a predetermined path, and is therefore generally applicable to any flexible-element drive system. It will be understood in the following description that although reference is made to the ink jet printer environment, the invention is not limited to this application.

In a cable or timing belt drive for moving a printer head in a back and forth motion along a guide member, one of the important parameters is the stiffness of the drive system. The stiffness (K), along with the mass (M) of the printer head carriage, determines the natural frequency $\omega_N$ of the system to be driven:

$$\omega_N = \sqrt{K/M} \ .$$

It is usually very desirable to keep $\omega_N$ and thus K as high as possible. This requirement produces a dilemma. To prevent excessive preload changes with environmental shifts, K should be as low as possible.

The usual solution is to provide a spring loaded idler pulley so that the position of the pulley can vary to compensate for changes in the belt or cable length. However, the idler spring combines with the cable or belt stiffness to produce a much lower overall stiffness.

It is therefore desirable to provide a drive system that has high performance without being subject to environmental changes.

SUMMARY OF THE INVENTION

This is provided by the present invention which provides a drive system having high natural frequency and stiffness, few parts, and simple, low cost design.

In particular, the present invention provides an apparatus for moving a mass along a predetermined mass path. The apparatus comprises a guide coupleable to a mass for maintaining the mass on the mass path. A cable comprises first and second cable portions, with each portion having two ends. One end of each cable portion is attached to the guide. First and second reels are rotatable about respective axes of rotation and are coupled to the other end of a respective one of the first and second cable portions for taking up and letting out the respective cable portion during movement of the mass along the mass path.

A pulley is fixed relative to the two reels for carrying one of the cable portions. A driver rotates the first and second reels about the respective axes of rotation, and thereby moves a mass coupled to the guide along the mass path.

The first and second reels, pulley and guide define a cable travel path which extends, with a substantially fixed length, between the first and second reels.

In a preferred embodiment of the apparatus of the invention, the one reel associated with the cable portion not carried by the pulley, the guide and the pulley are positioned so that the cable portion extending between the pulley and the guide extends along a fixed line throughout movement of the mass along the path. The fixed line is preferably parallel with the mass path.

It can be seen that such an apparatus has reduced parts and is economical to manufacture. Further, by having a cable path of a substantially fixed length, the cable drive has a high natural frequency and stiffness. These and other features and advantages of the present invention will become apparent from a reading of the following detailed description of the preferred embodiment with reference to the associated drawings.

BRIEF DESCRIPTION OF THE DRAWINGS

FIGS. 2–4 are simplified drawings representative of the apparatus of FIG. 1 showing the cable path for three positions of the mass along the mass path.

DETAILED DESCRIPTION OF THE PREFERRED EMBODIMENT

Figure 1:
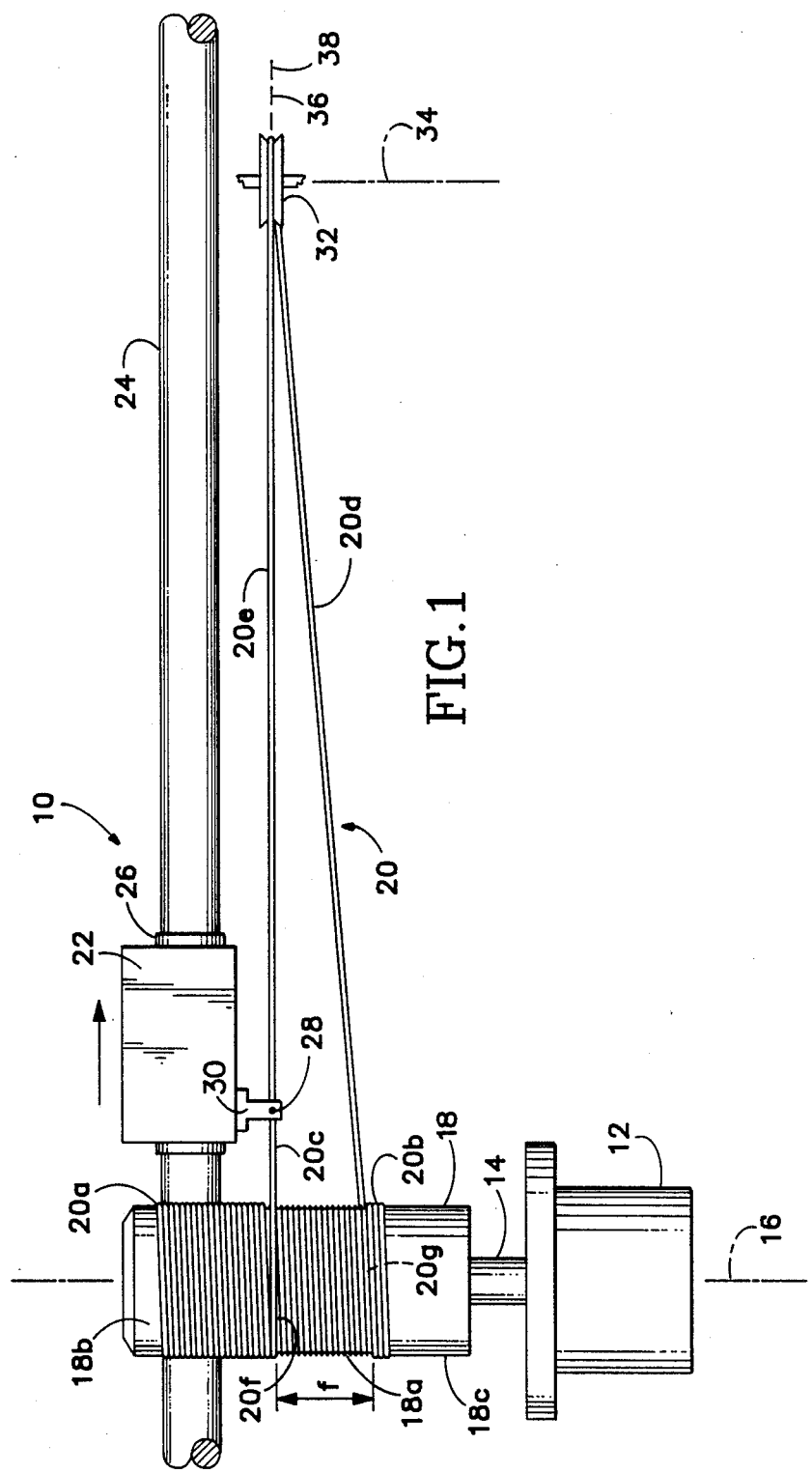
FIG. 1 is a top view of a preferred cable drive apparatus to the present invention.

Referring initially to FIG. 1, an apparatus 10 made according to the present invention is shown. Apparatus 10 comprises a motor 12 having a drive shaft 14 rotatable about an axis 16. Mounted on the shaft is a reel or capstan 18 having a helical groove 18a. The pitch diameter $D_P=0.848$ inches and the helical groove has a pitch of 0.060 inches.

The groove on the capstan is sized to receive a cable 20 having opposite ends 20a and 20b attached to opposite ends 18b and 18c, respectively, of the capstan. Ends 18b and 18c are also referred to herein as reel portions which are not required to be part of the same reel or be rotatable about the same axis of rotation.

A carriage 22 comprising an ink jet head is driven by motor 12 via cable 20 along a predetermined mass travel path defined by a rail 24. A guide member 26 is attached to carriage 22 and has a guide surface (not shown) in contact with rail 24.

Carriage 22 is attached to cable 20 at a point 28 by a coupler 30 which is fixedly coupled to the cable and the carriage. Point 28 in effect divides cable 20 into an upper cable portion 20c and a lower cable portion 20d. Portion 20c extends between point 28 and capstan top end 18b. Correspondingly, cable portion 20d extends between the point and the other end of the capstan. It will be apparent that cable portions 20c and 20d could be separate cables.

Cable portion 20d extends from capstan end 18c to an idler pulley 32 rotatable about an axis 34. In the preferred embodiment, axis 34 is fixed in position relative to and is parallel to axis 16 of the capstan and motor shaft.

Section 20e extends between pulley 32 and point 28 in a straight line 36 which is parallel to the mass path defined by rail 24.

The ends of cable portions 20c and 20d contact capstan 18 with portion ends 20f and 20g (hidden from view), respectively, a distance f apart, as shown. During operation and beginning with the carriage in the position shown in FIGS. 1 and 2, motor 12 rotates shaft 14 and capstan 18 so that cable is let out from capstan end 18a and taken up on capstan end 18b. This moves the carriage from the left position shown in FIG. 1 to a position to the right. The rotation is reversed in order to move the carriage to the left.

The same amount of cable is let out as is taken up for all positions of the carriage. Thus, the combined length of cable portions 20c and 20d is constant. However, the cable travel path extending from cable portion end 20f through point 28, around pulley 32 and to cable portion end 20g varies. This is because the positions of ends 20f and 20g move along axis 16 while cable section 20e is disposed on a fixed line 36. Line 36 also represents a plane 38 containing line 36, perpendicular to axes 16 and 34, and parallel to rail 24.

This is shown more clearly in FIGS. 2-4. FIG. 2 illustrates the geometry of cable drive apparatus 10 with carriage 22 in the left-most position, as shown in FIG. 1, e represents the minimum length of cable portion 20c. 1 represents the distance between axes 16 and 34. Again, f is the distance on capstan 18 between cable portion ends 20f and 20g. H is the distance from cable portion end 20g to pulley 24.

In FIG. 3, the carriage is at an intermediate point along the rail and cable portion end 20f is disposed away from plane 38, g represents the length of cable that has unwound from the capstan, x represents the portion of 1 corresponding to length g, and h represents the length of cable portion 20c. The distance that cable portion end 20f is above plane 38 is a. Thus, cable portion end 20g is a distance f−a below plane 38, as viewed in the figure.

In FIG. 4, the carriage is at the right-most position on rail 24. Distance a=f and cable portion end 20g is in plane 38.

The geometry shown results in a substantially constant total length of cable travel path, resulting in small preload changes. For instance, a cable having model number CF 3694 as made by CMA, has an "AE" of $12.63 \times 10^3$ lbs. For a length of cable, L=50 inches and a preload P=10 lbs, this results in a stretch $\Delta$=(PL/AE)=0.039 inches. This indicates that the total cable travel path length change should be restricted to about one tenth of the stretch, or more generally, to a few thousandths of an inch in order to keep the preload substantially constant.

The value of f is equal to the advance pitch times an integral number of helical circumferences of the capstan plus the advance pitch of one-half of a circumference. For an advance pitch of 0.060 inches, f can be 0.330, 0.390, 0.450, etc. A value of f=0.450 is used for the preferred embodiment.

In FIG. 3 the general case is shown.

$$a = (P_A \cdot g)/(D_P \cdot \pi)$$

and $$h^2 = a^2 + (x+e)^2$$

so $$h = \sqrt{a^2 + (x+e)^2}$$

and $$g \approx h - e$$

or $$g \approx \sqrt{a^2 + (x+e)^2} - e$$

Eliminating g:

$$a \approx (P_A (\sqrt{a^2 + (x+e)^2} - e))/(D_P \cdot \pi)$$

Reducing this equation in terms of a yields:

$$(((D_P \cdot \pi)/P_A)^2 - 1)a^2 + ((2 \cdot D_P \cdot \pi \cdot e)/P_A)a - (x^2 + 2 \cdot e \cdot x) = 0$$

Solving for a yields:

$$a = (-B \pm \sqrt{B^2 - 4AC})/2A$$

where $$A = ((D_P \cdot \pi)/P_A)^2 - 1$$

$$B = (2 \cdot D_P \cdot \pi \cdot e)/P_A$$

and $$C = -(x^2 + 2 \cdot e \cdot x)$$

An approximate analysis simply sets $$a \sim = (P_A \cdot x)/(D_P \cdot \pi)$$

The total cable path length is $$L = \sqrt{a^2 + (e+x)^2} + 1 - e - x + \sqrt{l^2 + (f-a)^2}$$

The following table lists the values of a and a∼ for x=1.0 inches to x=18.0 inches, f=0.45 inches, 1=20 inches, e=1.75 inches, $D_P$=0.848 inches, and $P_A$=0.060 inches.

TABLE

| x | (inches) a∼ | a | TOTAL LENGTH |
|---|---|---|---|
| 1 | 0.0225219 | 0.0225240 | 40.0047 |
| 2 | 0.0450439 | 0.0450499 | 40.0044 |
| 3 | 0.0675658 | 0.0675766 | 40.0041 |
| 4 | 0.0900877 | 0.0901036 | 40.0039 |
| 5 | 0.112610 | 0.112631 | 40.0038 |
| 6 | 0.135132 | 0.135158 | 40.0037 |
| 7 | 0.157653 | 0.157685 | 40.0036 |
| 8 | 0.180175 | 0.180213 | 40.0035 |
| 9 | 0.202697 | 0.202740 | 40.0034 |
| 10 | 0.225219 | 0.225268 | 40.0034 |
| 11 | 0.247741 | 0.247795 | 40.0034 |
| 12 | 0.270263 | 0.270323 | 40.0035 |
| 13 | 0.292785 | 0.292851 | 40.0035 |
| 14 | 0.315307 | 0.315378 | 40.0036 |
| 15 | 0.337829 | 0.337906 | 40.0037 |
| 16 | 0.360351 | 0.360433 | 40.0039 |
| 17 | 0.382873 | 0.382961 | 40.0040 |
| 18 | 0.405395 | 0.405488 | 40.0042 |

The total length is calculated on the quadratic solution of the value of a. However, it can be seen that the approximate values a∼ are quite close to the values of a but would show significantly more variation in the total length.

The actual variation in the total length is 0.0013 inches, well within the desired length variation tolerance desired. It is thus apparent that the geometry of the cable drive system shown in FIG. 1 provides a substantially constant cable path length over the range of movement of the mass along the predetermined path. This design allows the idler pulley to be fixed in position relative to the real portions so that additional spring dynamics are not introduced into the drive system.

It can be seen that the variation between incremental carriage positions is greatest at the extreme ends of the carriage travel. This equates to positions in which the cable portion ends contacting the capstan are also spaced from plane 38 a maximum amount. Thus, the further spaced the contact points are from plane 38 for a given distance of mass travel, the greater the incremental cable path length variance. In the preferred embodiment, the change in distance a, or 0.382968 inches is about 2¼ percent of the 17 inch length of carriage travel. Projecting the variance change per incremental carriage movement, it appears that the next 17 inches in length would produce about twice the variance, or a total variance of about 0.0039, which is the general design limit of the cable drive system. Correspondingly, for a 17 inch mass travel, a cable portion end travel on the capstan of about 0.77 inches would produce the same result, based on a∼. Thus, an upper limit of cable portion end travel of about 5 percent of the mass travel distance appears to be the maximum desirable in the preferred embodiment.

Some possible variations in the design have been suggested. Other variations are also possible. For instance, although a cable is specifically described, any equivalent device, such as a rope, string, or other flexible element would also be applicable. Further, the cable could be a continuous cable, in which case the drive motor could drive the pulley, rather than the reels. Thus, while the invention has been described with reference to the foregoing preferred embodiment, it will be understood that variations in the form and design of the apparatus may be made without varying from the spirit or scope of the invention as described in the claims.

I claim:

1. Fixed length cable drive apparatus for moving a mass along a predetermined mass path comprising:
    guide means comparable to a mass for maintaining the mass on the mass path during movement;
    fixed length cable means comprising first and second cable portions, with each portion having two ends, one end of each cable portion being attached to the guide means;
    first and second reel means rotatable about respective axes of rotation and being attached to the other end of a respective one of the first and second cable portion during movement of the mass along the path;
    pulley means fixed relative to the reel means for carrying one of the cable portions; and
    drive means for rotating the first and second reel means about the respective axes of rotation, and thereby moving a mass coupled to the guide means along the mass path;
    said cable means, reel means, and pulley means being arranged to provide a desired tensile preload in said cable means; and
    the first and second reel means, pulley means and guide means defining a cable travel path of substantially uniform length for all positions of the mass along the mass path, thereby maintaining the desired tensile preload in said cable means during movement of the mass along the mass path.

2. An apparatus according to claim 1 wherein the pulley means is disposed on a fixed plane perpendicular to the reel means axes of rotation, and during movement of the mass along the travel path, one of the points of contact of the cable portions to the reel means moves toward the fixed plane while the other point of contact of the cable portions to the reel means moves away from the fixed plane.

3. An apparatus according to claim 2 wherein the points of contact of the cable portions to the reel means are disposed on different sides of the fixed plane during movement of the mass along a predetermined portion of the mass path.

4. An apparatus for moving a mass along a predetermined mass path comprising:
    guide means comparable to a mass for maintaining the mass on the mass path during movement;
    cable means comprising first and second cable portions, with each portion having two ends and one end of each cable portion being attached to the guide means;
    first and second reel means rotatable about respective axes of rotation and being coupled to the other end of a respective one of the first and second cable portions for taking up and letting out the respective cable portion during movement of the mass along the mass portions; and
    drive means for rotating the first and second reel means about the respective axes of rotation, and thereby moving a mass coupled to the guide means along the mass path;
    the first and second reel means, pulley and guide means defining a cable travel path having a substantially fixed length, and the guide means and the pulley means being positioned so that the cable section extending between the pulley means and the guide means extends along a fixed plane throughout movement of the mass along the path, the fixed plane being perpendicular to the reel means axes of rotation, and the points of contact of the cable portions to the reel means are a constant distance apart.

5. An apparatus according to claim 4 wherein the points of contact of the cable portions to the reel means are disposed on different sides of the fixed plane during movement of the mass along a predetermined portion of the mass path.

6. An apparatus according to claim 5 wherein each point of contact of the cable portions to the two reel means moves from a position adjacent the fixed plane to a position spaced from the fixed plane during movement of the mass between the ends of the predetermined portion of the mass path.

7. An apparatus according to claim 6 wherein the maximum distances between the fixed plane and the points of contact of the cable portions when spaced from the fixed plane are substantially equal.

8. An apparatus according to claim 7 wherein the points of contact of the cable portions move less than five percent of the distance the mass moves along the mass path.

9. An apparatus for moving a mass along a predetermined mass path comprising:
    guide means coupleable to a mass for maintaining the mass on a straight mass path during movement;
    cable means comprising first and second cable portions, with each portion having two ends and one end of each cable portion being attached to the guide means;

reel means rotatable about an axis of rotation and being coupled to the other ends of the first and second cable portions for taking up and letting out the cable portions during movement of the mass along the mass path;

idler pulley means fixed relative to the reel means for carrying one of the cable portions; and drive means for rotating the reel means about the reel means axis of rotation, and thereby moving a mass coupled to the guide means along the mass path;

the reel means, idler pulley means and guide means defining a cable travel path having a substantially fixed length;

the guide means and the idler pulley means being positioned so that the cable section extending between the idler pulley means and the guide means extends along a fixed straight line parallel to the mass path throughout movement of the mass along the mass path; the straight line also being disposed in a plane perpendicular to the reel means axis of rotation, the points of contact of the cable portions to the reel means being disposed on different sides of the fixed plane during movement of the mass along a predetermined portion of the mass path, and moving less than five percent of the distance the mass moves along the mass path.

* * * * *

UNITED STATES PATENT AND TRADEMARK OFFICE
CERTIFICATE OF CORRECTION

PATENT NO. : 4,957,014

DATED : September 18, 1990

INVENTOR(S) : Edward F. Burke

It is certified that error appears in the above-identified patent and that said Letters Patent is hereby corrected as shown below:

Col. 5, line 43, "comparable" should be "coupleable"

Col. 5, line 52, "portion during movement..." should read "portions for taking up and letting out the respective cable portion during movement...".

Col. 5, line 54, "the reel means" should read "the two reel means".

Col. 6, line 17, "comparable" should be "coupleable".

Col. 6, line 28, "the mass portions; and" should read "the mass path;". The next paragraph was left out: "pulley means fixed relative to the two reel means for carrying one of the cable portions; and".

Col. 6, line 33, "pulley and" should read "pulley means and".

Signed and Sealed this

Eleventh Day of February, 1992

Attest:

HARRY F. MANBECK, JR.

*Attesting Officer*      *Commissioner of Patents and Trademarks*